March 4, 1930.  A. J. ERICKSON  1,749,132
AIRPLANE
Filed Oct. 18, 1928   3 Sheets-Sheet 1
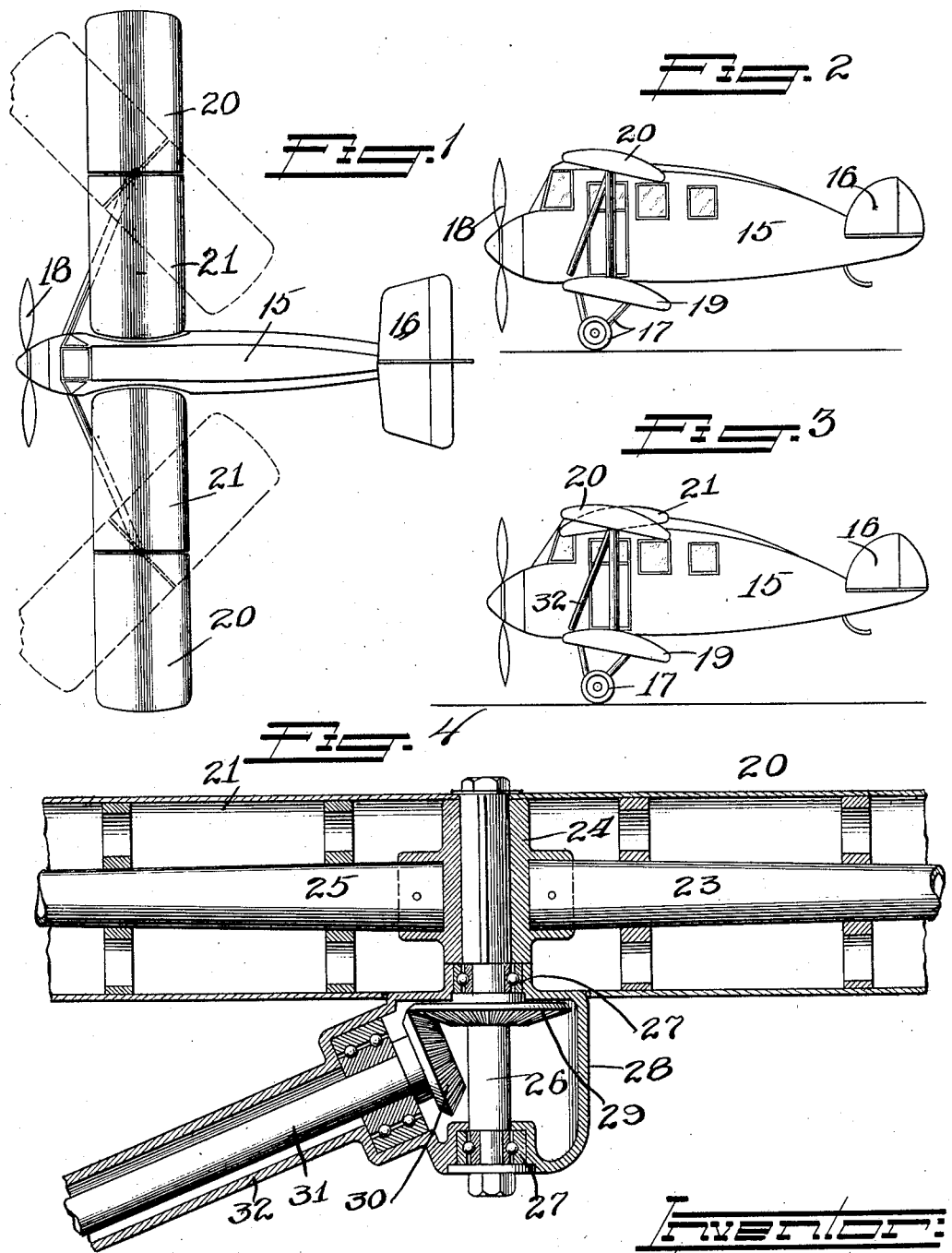

March 4, 1930.  A. J. ERICKSON  1,749,132
AIRPLANE
Filed Oct. 18, 1928   3 Sheets-Sheet 2
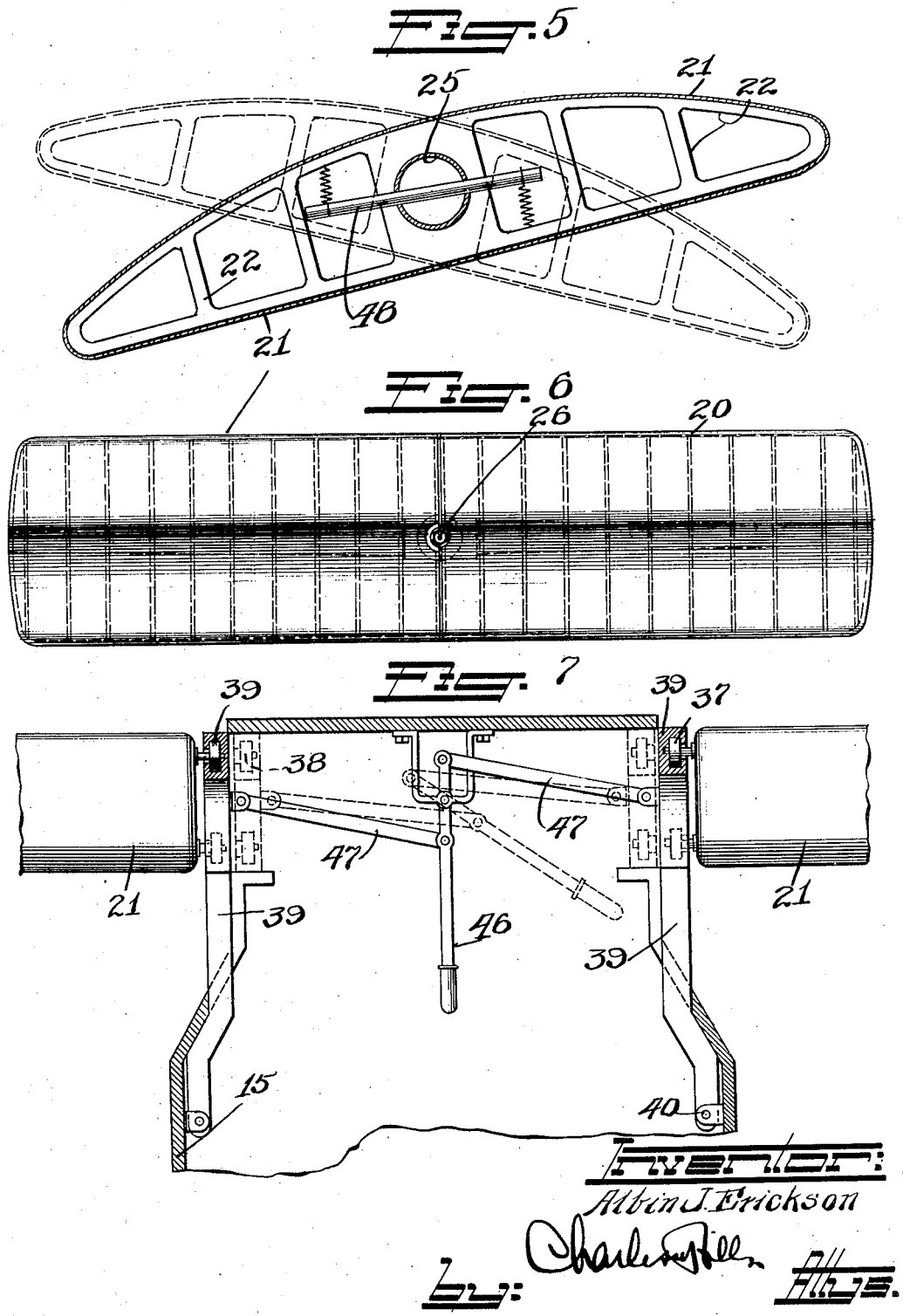

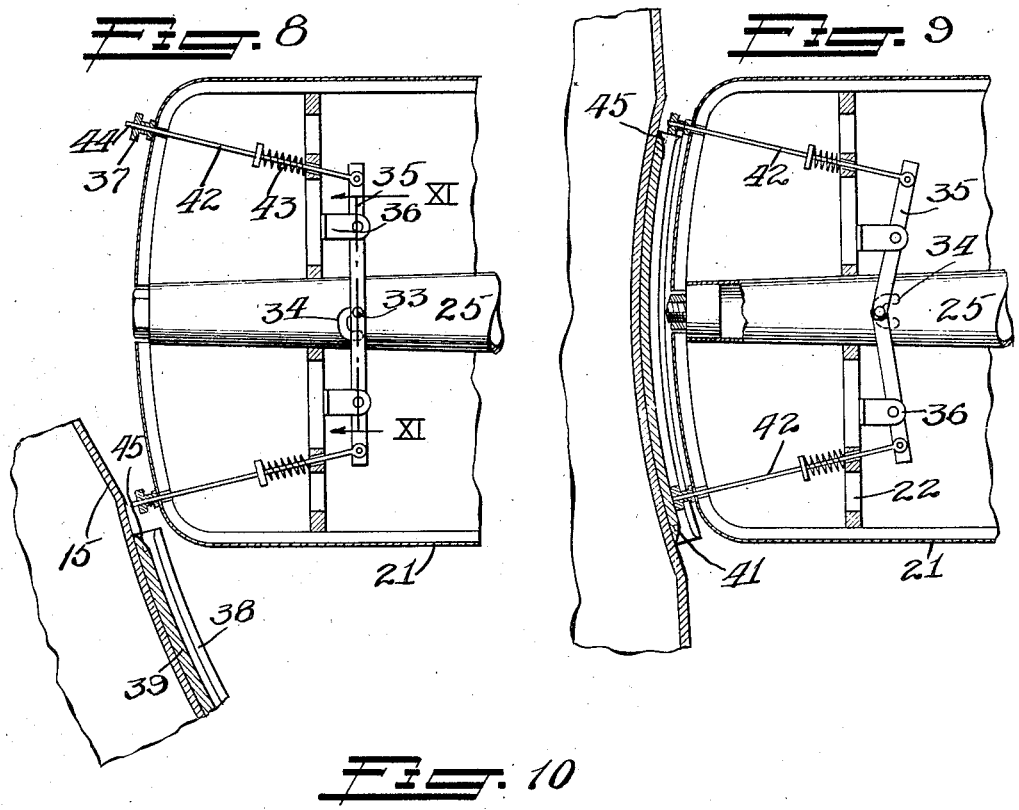
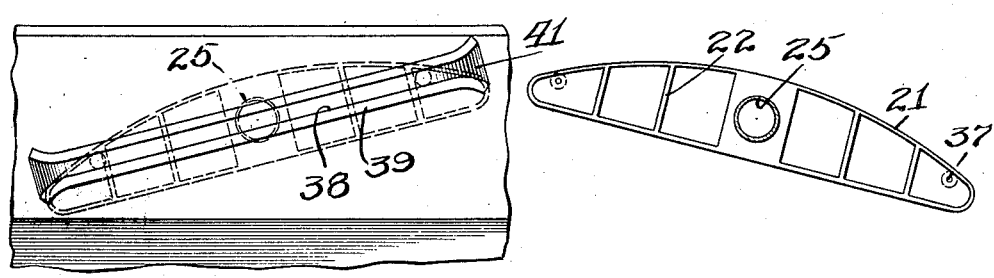
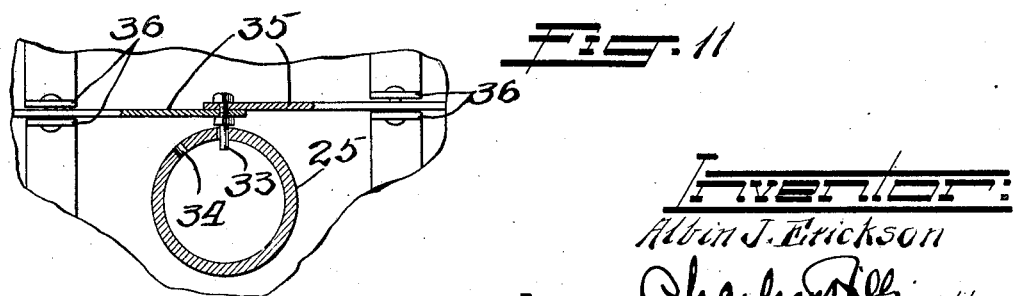

Patented Mar. 4, 1930

1,749,132

UNITED STATES PATENT OFFICE

ALBIN J. ERICKSON, OF CHICAGO, ILLINOIS

AIRPLANE

Application filed October 18, 1928. Serial No. 313,223.

This invention relates to airplanes and has special reference to a combination of fixed lifting surfaces with lifting surfaces convertible from fixed to rotating and vice versa, the rotating surfaces being commonly designated as a helicopter.

It is therefore an object of this invention to provide an airplane wherein a major portion of the lifting or descent retarding forces is formed as a helicopter for taking off and landing while for normal flight conditions the helicopter surfaces are converted into fixed lifting surfaces of the normal wing form. The major advantages of this invention reside in a combination of the highly efficient straight away characteristics of a fixed wing form with the short take off and landing run characteristic of the helicopter.

It is also an object of this invention to provide mechanism for readily shifting from one arrangement of the lifting surfaces to another whereby an airplane incorporating the present invention may be operated as a modified helicopter during the take-off and until the desired height has been reached, and then converted into a normal fixed wing airplane at the will of the operator, who is also enabled to reconvert the airplane into a helicopter at will for purposes such as to retard descent and reduce the landing speed and run, or to climb more nearly vertically than can be done with fixed wings.

Other and further important objects of this invention will be apparent from the disclosures in the specification and accompanying drawings.

The invention (in a preferred form) is illustrated on the drawings and hereinafter more fully described.

On the drawings:

Figure 1 is a top plan view of an airplane embodying the features of this invention, the wing movement being indicated by dotted lines.

Figure 2 is a side elevation of the airplane with the upper wing adjusted as a fixed lifting surface.

Figure 3 is an elevation similar to Figure 2 wherein the upper wing has been adjusted for rotary movement.

Figure 4 is an end fragmentary section of the rotary drive for one wing, partly shown in elevation.

Figure 5 is a cross section through the tilting wing panel, showing the tilted position in dotted lines.

Figure 6 is a plan view of one upper wing.

Figure 7 is a fragmentary detail section of the wing releasing mechanism.

Figure 8 is a fragmentary section parallel to the wing plane through one wing tip and its engaging mechanism.

Figure 9 shows a further movement of the mechanism of Figure 8.

Figure 10 is a cross section further illustrating the engaging mechanism as the wing is about to enter the same, the final position of the wing tip being indicated in dotted lines.

Figure 11 is an end fragmentary section on the line XI—XI of Figure 8.

As shown on the drawings:

An airplane embodying a conventionalized showing of a fuselage 15 with rear control surfaces 16, an under carriage 17, a propeller 18, together with fixed lower wing sections 19, is shown in Figures 1 and 2. The present invention relates to the construction and arrangement of the upper wing section and their associated parts. The upper wing section on each side of the fuselage comprises two similar panels, an outer fixed angle panel 20 and an inner tiltable panel 21. As best shown in Figure 5 the tiltable panel is made symmetrical in cross section relative to its longitudinal center line in order that its lifting effect may be the same regardless of which edge is the leading edge. as these panels are required to reverse their effective leading edges when operated as a helicopter, as distinguished from their operating position as a fixed wing.

Each wing panel is built up by covering a number of ribs 22 which in the case of the outer panels 20 are rigidly mounted on a central tubular spar 23 one end of which is secured in a hub 24. The ribs for the inner panel 21 are pivoted on a similar spar 25 likewise secured in the hub 24 which is in turn keyed to a vertical shaft 26 journaled in bearings 27 in a gear housing 28 containing a bevel gear 29 on the shaft 26 and a driving pinion 30 on an inclined driving shaft 31 which extends within a strut 32 extending to the fuselage 15 where the shaft 31 is connected to the airplane power plant by suitable power take off and control mechanisms.

As previously mentioned, the inner panels 21 are pivotally mounted on their spars 25. When the upper wings are to be used as fixed lifting surfaces the inner panels are held at the same positive angle of incidence as the outer panels 20 by locking means such as a pin 33 engaging in the upper extremity of a semicircular slot 34 in the spar 25, the pin in turn being engaged by levers 35 pivotally mounted in brackets 36 secured to one of the wing spars 22. The wing panels are further held rigid by shouldered dogs 37 carried by the panel tip and engaging in T slots 38 in members 39 which are pivoted at 40 in the fuselage. The shouldered dogs 37 prevent a retraction of the member 39 while the wing panel 21 is in alignment therewith, so that the upper wings must be partially rotated to disengage or engage with the members 39. To facilitate reengagement the mouths or ends of the T slots 38 are flared as indicated at 41.

When the upper wings are to be rotated as helicopters they are first partially rotated to release the dogs 37 from the members 39 and as these members are necessarily inclined to the same position angle as the fixed wing, the movement of the dogs in the T slot automatically tips or rotates the movable wing panel 21 to an equal or reverse angle of incidence, converting the two wing panels on each side of the fuselage into separate helicopter propellers wherein the wing panels on each side of the shaft 26 correspond to propeller blades.

Rods 42 are provided which project through the dogs 37 to engage the levers 35 previously mentioned. These rods are pressed outwardly by springs 43 and their projecting tips 44 engage the rounded bottoms 45 of the T slot 38 to move the pins 33 in the slots 34 as shown in Figure 9 as the wing is rotated from its locked position, thus transferring the pin from the upper portion of the slot 34 as the wing is automatically tilted.

When the wing panel 21 swings clear of the member 39 the latter is intended to be retracted clear of the sweep of the dogs 37 by a manually actuated pivoted lever 46 having links 47 connected to both of the slot members 39, the operation of this lever being self evident from the dotted line position shown in Figure 7. The shouldered dogs 37 engaging in the T slot 38 prevent retraction of the members 39 before the wing panel 21 has been swung out of engagement therewith, the panel thus being automatically tilted prior to converting the wing section into helicopter propellers.

The tilting wing sections 21 are further supported in their downwardly tilted positions by a bar 48 mounted in the spar 25, the ends of the bar contacting the ribs 22 when the wing section is tilted to its extreme position as indicated by the dotted lines in Figure 5.

In the operation of the illustrated embodiment of my invention it is intended to use the rotating or helicopter wing sections as lifting propellers to assist in taking off and gaining altitude with a reduction in horizontal travel. The upper wing sections are therefore started in rotating motion when ready to take off and as soon as the dogs disengage from the members 39 the latter are retracted by the lever 46 as previously described, after which full power can be applied to rotate the shaft 26 carrying the wing sections.

When sufficient altitude has been gained and it is desired to obtain maximum horizontal speed the power is thrown off, slowing down the rotating wing sections and the members 39 are swung out to reengage the dogs 37 as best indicated in Figures 8 and 10. When the leading dog enters the T slot 38 the rod 42 is pushed in to release the pin 33 and simultaneously the inclined slot causes a tilting of the wing pane 21 back to its positive angle of incidence. When both dogs are properly engaged in the T slot the wing panel is held rigid, converting the airplane into a normal biplane with fixed wings as shown in Figure 2.

I am aware that numerous details of construction may be varied through a wide range without department from the principles of this invention, and I therefore do not purpose limiting the patent granted, otherwise than necessitated by the prior art.

I claim as my invention:

1. An airplane of the type described comprising a wing section and mounting means therefor comprising an axis about which said wing section is adapted to rotate, means for rotating said wing section, means adapted to alter the angle of incidence of a portion of said wing section whereby to convert said wing section into a propeller, and means for releasably engaging and locking said wing section to form a fixed lifting surface.

2. An airplane of the type described comprising a wing section, a convertible wing section and mounting means therefor comprising an axis about which said wing section is adapted to rotate, means for rotating said wing section, means adapted to alter the angle of incidence of a portion of said wing section whereby to convert said wing section into a propeller, and means for releasably engaging and locking said wing section to form a fixed lifting surface.

In testimony whereof I have hereunto subscribed my name at Chicago, Cook County, Illinois.

ALBIN J. ERICKSON.